Figure 1:
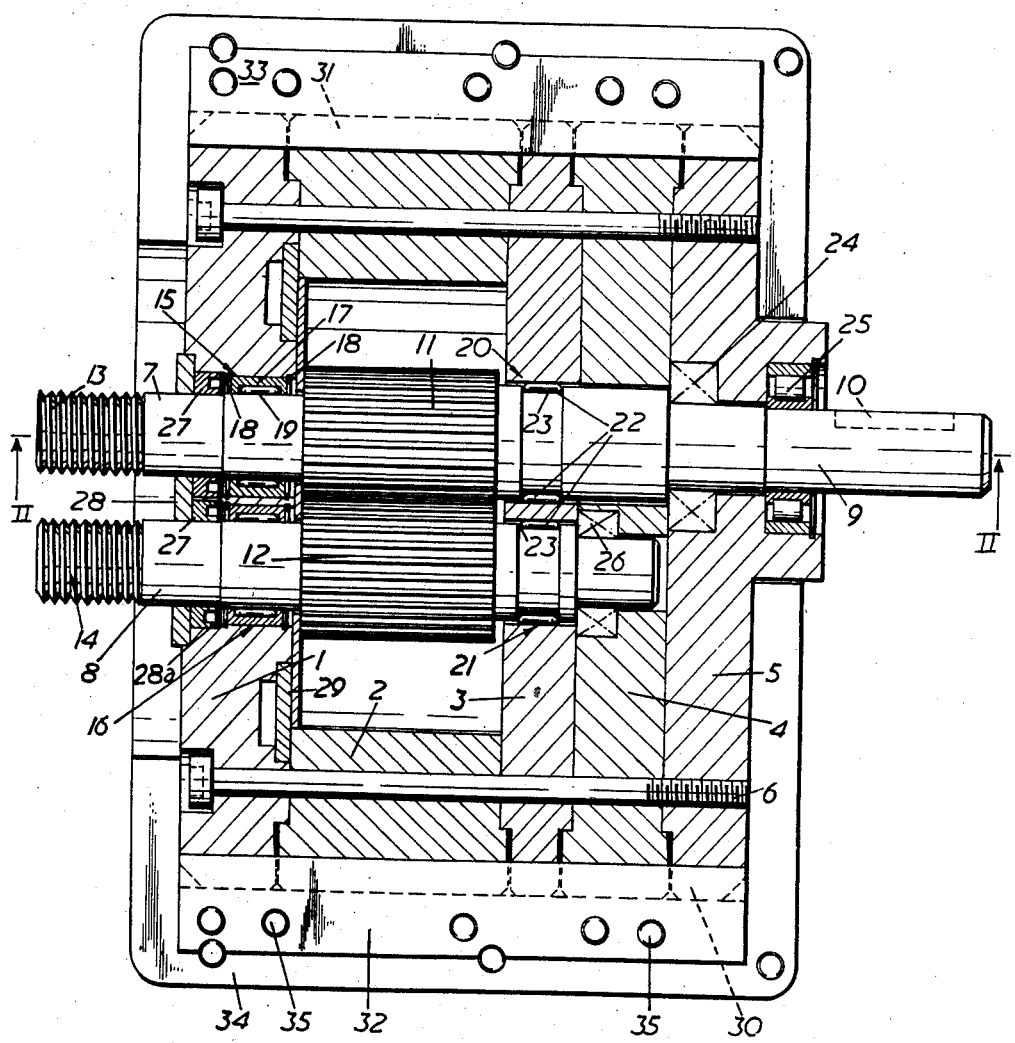

United States Patent Office 2,892,362
Patented June 30, 1959

2,892,362

TWIN CONTRA-ROTATING PARALLEL DRIVE SHAFT ASSEMBLIES

Donald Cameron Nicholas, Ipswich, England, assignor to B.X. Plastics Limited, Highams Park, London, England, a British company Application March 20, 1957, Serial No. 647,261

Claims priority, application Great Britain March 23, 1956

6 Claims. (Cl. 74—665)

The present invention concerns twin contra-rotating parallel drive shaft assemblies. More particularly the invention concerns such assemblies suitable for use in conjunction with double-screw plastic extruding machines to drive the rotating screws thereof. In such use large back thrusts and separating forces on the shafts are experienced in extruding the harder plastics. It will be appreciated that the centre distance between the shafts is limited in this case to the predetermined distance between the centres of the screws. This imposed limitation together with the need to provide thrust bearings to absorb the large back thrusts on the shafts has rendered it difficult to produce commercially satisfactory assemblies capable of driving existing extruding machines in that such assemblies have been subject to frequent mechanical defects and breakdowns.

It is an object of the present invention to provide a construction of twin contra-rotating parallel drive shaft assembly particularly suitable for assemblies for driving the rotating screws of double-screw plastic extruding machines in that within an imposed limitation on the shaft centre distance and under conditions of use in which large back thrusts and separating forces on the shafts may be experienced, it enables an assembly to be provided which is both strong and reliable in use.

Thus according to the present invention there is provided a twin parallel drive shaft assembly comprising two shafts each having a pinion thereon, the shafts being disposed with the pinions intermeshing, so that in use the shafts rotate in opposite directions, one of said shafts being adapted to be driven from an external drive thereby serving in use both to transmit power itself and to drive the other shaft, a front end plate in which said shafts are journalled in first bearings at the driving end side of the pinions and closely adjacent thereto, a bearing plate in which the shafts are journalled in second bearings at the other side of the pinions and closely adjacent thereto, said second bearings for said shafts comprising needle rollers running in direct contact with the shafts and the bearing plate, means spacing the front end and bearing plates apart, a rear end plate and an intermediate plate separating the rear end and bearing plate, the said one shaft and other shaft being journalled in thrust bearings respectively mounted in said rear end and intermediate plates, all of said plates and said means being rigidly secured together as a unit in a releasable manner.

We prefer that said needle rollers shall run in tracks formed in the said shafts. It will be appreciated that the bearing surfaces of the bearing plate and the said tracks in the shafts will be of a suitable hardness to withstand wear by direct contact with the needle rollers. The bearing plate will preferably be of a high grade non-distorting tool steel hardened to a minimum of 600 Brinell whilst the tracks in the shafts will be locally hardened to the same degree.

This provision of needle rollers running in direct contact with the shafts and the bearing plate at the second bearings for the shafts avoids any reduction in the shaft diameters such as might be necessitated by incorporation of orthodox bearing tracks due to the close spacing of the shafts with consequent weakening and a reduction in the maximum torque capable of being transmitted. It will be readily appreciated that the avoidance of any substantial reduction in the diameter of the said one shaft at this point is particularly advantageous since at this point the entire power input of the assembly is transmitted by this shaft.

Moreover by avoiding any necessity of a substantial reduction of the shaft diameter at the second bearings and by providing for the thrust bearings for the shafts to be mounted one in each of the intermediate and rear end plates, thrust bearings of the greatest possible diameters may be employed.

The diameters of the pinions are determined by the centre distance between the shafts and hence in order that they may be capable of transmitting the maximum safe torque which the shafts are themselves capable of transmitting the face width of the teeth may have to be relatively large in order to provide adequate contact area between the teeth. However, with gears of relatively large face width as compared with their diameter it is necessary to ensure that the gears are held in perfect alignment and this is best ensured by the use of needle bearings since these bearings are most accurate and resistant to wear.

Hence the first bearings in which the shafts are journalled in the front end plate will preferably also be needle bearings. Since the load at this point is divided between the shafts it is not of prime importance to avoid any reduction in the diameter of the shafts and hence it is not necessary here to employ the arrangement of the needle bearings provided at the second bearings for the shafts. Preferably, therefore, the first bearings for the shafts each comprise needle rollers running within an orthodox track which is mounted in the front end plate, the rollers running in direct contact with the surface of the shaft which is suitably hardened to withstand wear.

Slight inaccuracies in the pinions or slight misalignment thereof may result in a forward thrust on the shafts when running on no load and hence it is preferred to provide a hard steel bearer which is disposed against the inner face of the front end plate.

The said spacing means may if desired be formed integrally with the front end plate or the bearing plate although it is preferred that it be separate and comprise an annular plate so as to define a housing for the pinions. Any of the said plates may if desired be split except the bearing plate but it is preferred that they each be an integral whole.

Preferably said plates are adapted so that after dismantling of the assembly they may be readily reassembled identically positioned as before with respect to one another.

Thus it is preferred that all the plates be circular and that they be located with respect to one another by spigot and socket connections therebetween and releasably clamped together by a plurality of axially extending tie bolts. It will be appreciated that said tie bolts may have to contain all the resultant stresses imposed rearwardly on the thrust bearings. Further it is preferred that one or more key-ways be cut in the circumference of the plates extending parallel to the axes of the shafts in order that by insertion of a corresponding key or keys the plates after dismantling, may be readily orientated with respect to one another identically as before on reassembly.

Preferably the assembly is mounted within a split housing and this is conveniently achieved by providing the plates with two diametrically opposed key ways and mounting the assembly by means of keys disposed in the said keyways which keys protrude beyond the surfaces of the plates and are secured in the housing by bolts.

It will be understood that lubrication of the bearings may be provided for by forming oil feed channels drilled in the plates preferably in the interfaces thereof, which channels may communicate with an oil feed bore drilled transversely thereto in the plates. The same feed bore may feed oil to a spray pipe which delivers oil directly onto the pinions.

Figure 2:
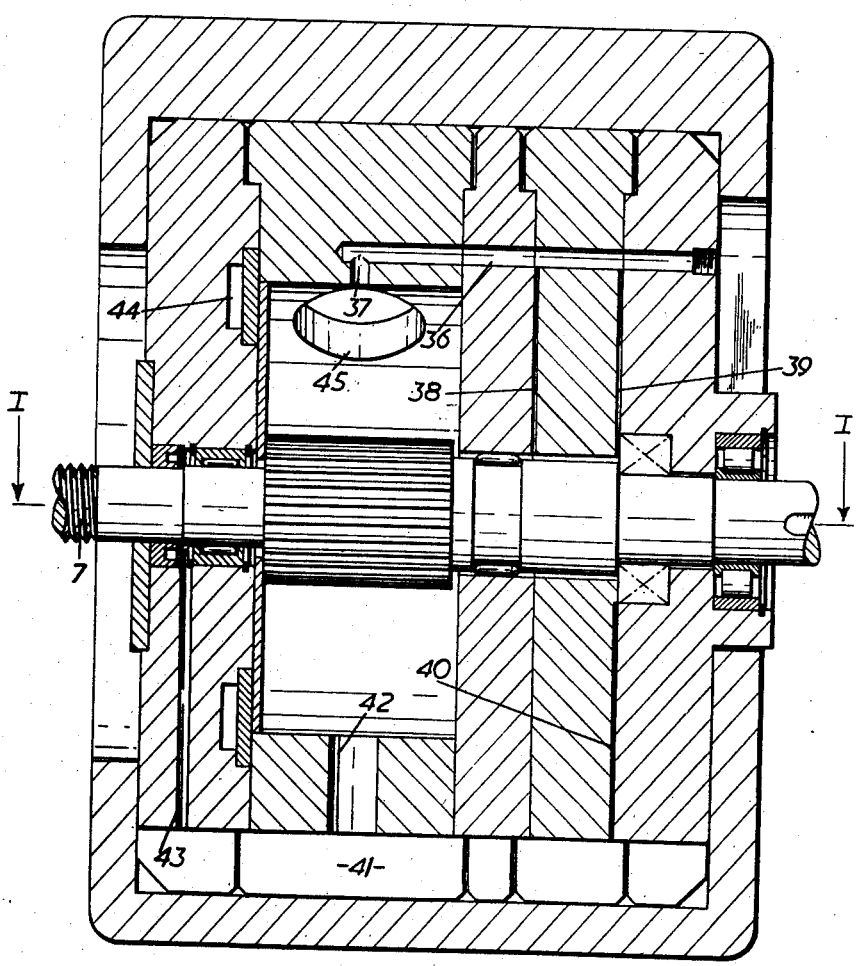

In order that the invention may be well understood there will now be described one preferred embodiment thereof, by way of example only, with reference to the accompanying drawings in which:

Fig. 1 is a plan view in section on the line I—I of Fig. 2 of an assembly according to the invention mounted within a housing; and Fig. 2 is a side elevation in section on the line II—II of Fig. 1.

Referring to the drawings the assembly comprises a front end plate 1, a spacer plate 2, a bearing plate 3, an intermediate plate 4, and a rear end plate 5 all of which plates are circular and are located axially with respect to one another by spigots as shown and secured rigidly together by longitudinally extending tie bolts 6.

The assembly further comprises two parallel shafts 7, 8 journalled in the said plates. The shaft 7 is the driven shaft of the assembly and extends beyond the rear end plate 5 at which end 9 thereof it is adapted by the provision of a key 10 to be driven by a drive shaft (not shown) of an external source of motive power. This shaft 7 serves both to transmit power itself and to drive the shaft 8 by means of intermeshing pinions 11, 12 on it and the shaft 8 respectively. It will be seen that the spacer plate 2 has a large centrally disposed aperture therein whereby in conjunction with the front end and bearing plates 1, 3 a housing is defined for the pinions 11, 12.

The driving ends 13, 14 of the shafts 7, 8 extend beyond the front end plate and are adapted to drive, for example, the twin screws of a plastic extruding machine e.g. by the provision of key ways therein or by being splined or threaded (as shown). The shafts 7, 8 are journalled in the front end plate 1 respectively in identical needle bearings 15, 16 which each comprise an orthodox track 17 mounted in the plate 1 by circlips 18 in which needle rollers 19 run in direct contact with the surface of the respective shaft which is suitably hardened at this point to withstand wear.

It will be noted that the bearings 15, 16 are closely adjacent the driving ends of the pinions 11, 12. The shafts 7, 8 are also journalled in identical needle bearings 20, 21 in the bearing plate 3 which bearings are closely adjacent the other ends of the pinions. This bearing plate 3 is of a high grade non-distorting tool steel hardened to 600 Brinell and the bearings 20, 21 each comprise needle rollers 22 located in a track 23 formed in the surface of the respective shaft and running in direct contact therewith and with the bearing plate 3. The tracks 23 are hardened to withstand wear by the needle rollers 22.

The shaft 7 is also journalled in a thrust bearing 24 mounted in the inner face of the rear end plate 5 and in a roller bearing 25 mounted in the outer face of the plate 5.

The shaft 8 terminates within the bearing plate 3 in which it is journalled in a thrust bearing 26 mounted in the inner face thereof.

It will also be seen that oil seals 27 are provided for the shafts at the bearings 15, 16 which seals are retained in position between a cover plate 28 located within a recess formed in the outer face of the front end plate 1 and washer rings 28a.

A hard steel bearer 29 is provided within the housing for the pinions and abuts against the inner face of the front end plate 1 and serves to engage shoulders on the shafts to take up any forward thrust thereon when running on no load due to inaccuracies in the pinions or slight misalingment thereof.

The plates are provided with two diametrically opposed key ways 30, 31, radially cut in the circumference and extending parallel to the common axis thereof. Keys 32, 33 mounted within the key ways and extending radially beyond the surfaces of the plates serve to mount the assembly within a split housing 34 which is suitably recessed to provide seats in which the keys are bolted as indicated at 35.

As shown in Fig. 2 an oil feed hole 36 is drilled in the plates parallel to the common axis thereof and extends from the rear end plate 5 to the spacer plate 2 where it communicates with a transverse bore 37 at right angles thereto which leads into the housing for the pinions and serves to deliver oil directly onto the pinions.

Oil feed channels are provided in the interfaces of the plates 3, 4 and 4, 5, which lead to the second bearings 20, 21 and the thrust bearings 24, 26 for the shafts. Two such channels 38, 39 are shown in Fig. 2. The oil is returned via further such channels e.g. as indicated at 40 in Fig. 2, to a sump 41 in the base of the housing 34. Similarly oil fed to the pinions is returned to this sump through an aperture 42 in the lower part of the spacer plate 2. A return channel 43 is shown in the plate 1 which also returns oil at the first bearing for the shaft 7 to the sump 41. It will be understood that all the various bearings will be lubricated generally in the manner described.

In use of the assembly it may happen that appreciable conduction of heat to the front end plate 1 or the driving shafts 7, 8 takes place. This is undesirable in that the bearings 15, 16 and oil seals 27 may become overheated. In order, therefore, to prevent such overheating, a cooling channel 44 is provided in the front plate 1. An inlet and outlet for this channel (not shown) will be provided to enable coolant to be circulated therethrough.

An inspection aperture 45 is also provided in the spacer plate 2 giving direct access to the pinions 11, 12 for the purpose of observing oil flow to the pinions.

The preferred embodiment of the present invention above described constitutes an assembly which within the imposed limitations on shaft centre distance is very strong and reliable and which moreover, is readily dismantled and reassembled.

Whilst one preferred embodiment of the invention has been described by way of example in detail, it will be appreciated that modifications and alterations thereto may be made without departing from the scope of the invention. It will also be appreciated that it is within the scope of the present invention to provide a double-screw plastic extruding machine incorporating a twin drive shaft assembly as herein set forth.

I claim:

1. A twin parallel drive shaft assembly comprising two shafts each having a pinion fixed thereon, the shafts being disposed in closely spaced parallel relation with the pinions intermeshing so that in use the shafts rotate in opposite directions, one of said shafts being adapted to be driven from an external drive thereby serving in use both to transmit power itself and to drive the other shaft, a front end plate in which said shafts are journalled in first bearings at the driving end side of the pinions and closely adjacent thereto, a bearing plate in which the shafts are journalled in second bearings at the other side of the pinions and closely adjacent thereto, said second bearings for said shafts comprising needle rollers running in direct contact with the shafts and the bearing plate, means spacing the front end and bearing plates apart, a rear end plate and an intermediate plate between the rear end and bearing plate, the said one shaft and other shaft being further journalled in thrust bearings respectively mounted in said rear end and intermediate plates, all of said plates and said means being releasably secured together as a unit.

2. An assembly as claimed in claim 1 wherein the needle rollers of the second bearings run in tracks formed in said shafts and the first bearings are needle bearings running in direct contact with the said shafts.

3. An assembly as claimed in claim 1 in which a hard steel bearer is provided which is disposed against the inner face of the front end plate and engages shoulders on said shafts so as to take up any forward thrust on the shafts.

4. An assembly as claimed in claim 1 in which the plates are located with respect to one another by spigot and socket connections therebetween and in which at least one keyway is provided in the circumference of the plates parallel to the axes of the shafts whereby by the insertion of a corresponding key therein the plates on reassembly after dismantling may be orientated with respect to one another, identically as before.

5. A drive shaft assembly comprising a pack of plates arranged in face-abutting relationship, one of the plates within said pack having an opening therethrough defining a gear chamber, a pair of parallel shafts extending through said chamber, a pair of meshing gears in said chamber, said gears being respectively fixed to said shafts, said shafts being journalled in radial bearing means in the plates adjacent and on opposite sides of the chamber, one of said shafts extending through both ends of said pack to serve as both a drive shaft and a driven shaft, one end of the other of said shafts extending beyond one end only of said pack to serve as a drive shaft, the opposite end of said other shaft terminating within one of said plates, a thrust bearing for each shaft, each thrust bearing being mounted in a separate plate, the thrust bearing for said other shaft being mounted in a plate nearer said chamber than the plate mounting the thrust bearing for said one shaft, and means releasably securing said plates together in said pack in predetermined fixed relationship.

6. A drive shaft assembly as defined in claim 5 wherein said pack of plates comprises at least five plates, said thrust bearings being mounted in adjacent plates separate from said plates adjacent the chamber.

References Cited in the file of this patent

UNITED STATES PATENTS

| | | |
|---|---|---|
| 1,059,450 | Foote | Apr. 22, 1913 |
| 1,109,945 | Seiss | Sept. 8, 1914 |
| 2,058,055 | Boock | Oct. 20, 1936 |
| 2,441,722 | Schultz | May 18, 1948 |
| 2,482,110 | Hill | Sept. 20, 1949 |
| 2,581,025 | Karow | Jan. 1, 1952 |
| 2,743,789 | Ferguson | May 1, 1956 |
| 2,756,684 | Renzo | July 31, 1956 |
| 2,784,614 | Conover | May 12, 1957 |